United States Patent
Sailor et al.

(10) Patent No.: US 8,307,930 B2
(45) Date of Patent: Nov. 13, 2012

(54) SCALABLE, HYBRID ENERGY STORAGE FOR PLUG-IN VEHICLES

(75) Inventors: Eric Sailor, Fort Wayne, IN (US); Colin J. Casey, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 729 days.

(21) Appl. No.: 12/505,575

(22) Filed: Jul. 20, 2009

(65) Prior Publication Data

US 2011/0011659 A1    Jan. 20, 2011

(51) Int. Cl.
*B60W 10/24* (2006.01)

(52) U.S. Cl. .................. 180/65.29; 180/65.275

(58) Field of Classification Search ............ 180/2.1, 180/2.2, 60, 65.1, 65.24, 65.265, 65.285, 180/65.29, 65.225, 65.31, 65.21, 65.245; 320/103, 104
See application file for complete search history.

(56) References Cited

U.S. PATENT DOCUMENTS

| | | | | |
|---|---|---|---|---|
| 3,861,487 A | * | 1/1975 | Gill | 180/65.31 |
| 3,874,472 A | * | 4/1975 | Deane | 180/65.245 |
| 3,972,380 A | * | 8/1976 | Hudson et al. | 180/65.25 |
| 4,254,843 A | * | 3/1981 | Han et al. | 180/165 |
| 4,277,737 A | * | 7/1981 | Muller-Werth | 320/127 |
| 4,363,999 A | * | 12/1982 | Preikschat | 318/53 |
| 5,418,437 A | * | 5/1995 | Couture et al. | 318/139 |
| 5,572,108 A | * | 11/1996 | Windes | 320/167 |
| 5,686,818 A | * | 11/1997 | Scaduto | 180/65.1 |
| 5,915,488 A | * | 6/1999 | Fliege | 180/65.22 |
| 5,920,127 A | * | 7/1999 | Damron et al. | 290/44 |
| 6,031,355 A | * | 2/2000 | Rich | 320/117 |
| 6,082,476 A | * | 7/2000 | Stulbach | 180/65.25 |
| 6,189,635 B1 | * | 2/2001 | Schuler et al. | 180/68.5 |
| 6,271,645 B1 | * | 8/2001 | Schneider et al. | 320/118 |
| 6,281,660 B1 | * | 8/2001 | Abe | 320/103 |
| 6,335,574 B1 | * | 1/2002 | Ochiai et al. | 290/40 C |
| 6,430,101 B1 | * | 8/2002 | Toda | 365/225.7 |
| 6,583,602 B2 | | 6/2003 | Imai | |
| 6,608,396 B2 | | 8/2003 | Downer | |
| 6,791,295 B1 | * | 9/2004 | Berels | 320/103 |

(Continued)

FOREIGN PATENT DOCUMENTS

EP    1340908 B1    3/2003

(Continued)

OTHER PUBLICATIONS

International Search Report and Written Opinion from corresponding application, PCT/US2010/035729, dated May 21, 2010.

*Primary Examiner* — Katy M Ebner
*Assistant Examiner* — Brodie Follman
(74) *Attorney, Agent, or Firm* — Jeffrey P. Calfa; Mark C. Bach

(57) ABSTRACT

An energy storage module (30, 32) for an electric vehicle or hybrid electric vehicle (12). Multiple low-voltage storage batteries (36) disposed on a tray (60) and connected in parallel circuit relationship form a low-voltage battery bank. A DC-to-DC converter (42) has an input connected to the low-voltage battery bank and an output connected to a high-voltage energy storage bank (34). An AC-to-DC converter (40) is connected to the low-voltage battery bank for charging the low-voltage battery bank from a source of AC electricity (45).

11 Claims, 3 Drawing Sheets

U.S. PATENT DOCUMENTS

| | | | |
|---|---|---|---|
| 6,909,201 B2 | 6/2005 | Murty | |
| 6,941,917 B2* | 9/2005 | Kawai et al. | 123/179.4 |
| 6,966,803 B2* | 11/2005 | Hara et al. | 440/6 |
| 6,972,164 B2 | 12/2005 | Nemoto | |
| 7,208,894 B1* | 4/2007 | Earle | 318/105 |
| 7,267,090 B2* | 9/2007 | Tamai et al. | 123/179.3 |
| 7,290,627 B1* | 11/2007 | Gardner | 180/65.1 |
| 7,663,349 B2* | 2/2010 | Tarng et al. | 323/225 |
| 7,687,934 B2* | 3/2010 | Helmick | 307/9.1 |
| 7,750,607 B2* | 7/2010 | Nakajima et al. | 320/167 |
| 7,766,788 B2* | 8/2010 | Shamoto | 477/3 |
| 7,830,118 B2* | 11/2010 | MacNair et al. | 320/128 |
| 7,854,282 B2* | 12/2010 | Lee et al. | 180/65.24 |
| 7,888,910 B2* | 2/2011 | Zeng | 320/118 |
| 7,889,524 B2* | 2/2011 | Lee et al. | 363/65 |
| 7,997,363 B2* | 8/2011 | Mori et al. | 180/65.265 |
| 8,004,109 B2* | 8/2011 | Komatsu | 307/9.1 |
| 8,043,132 B1* | 10/2011 | Wyant | 440/1 |
| 8,047,316 B2* | 11/2011 | Takami et al. | 180/65.29 |
| 8,109,354 B2* | 2/2012 | Lin | 180/65.31 |
| 8,115,334 B2* | 2/2012 | Vyas et al. | 307/10.1 |
| 8,120,308 B2* | 2/2012 | Ward | 320/101 |
| 8,120,310 B2* | 2/2012 | Littrell et al. | 320/104 |
| 2003/0029654 A1* | 2/2003 | Shimane et al. | 180/65.4 |
| 2003/0037748 A1* | 2/2003 | Kawai et al. | 123/179.4 |
| 2003/0122512 A1* | 7/2003 | Auerbach | 318/139 |
| 2004/0040755 A1* | 3/2004 | Swindell et al. | 180/2.2 |
| 2004/0051500 A1* | 3/2004 | Kuroda et al. | 320/104 |
| 2006/0127704 A1* | 6/2006 | Raiser | 429/9 |
| 2006/0250902 A1* | 11/2006 | Bender et al. | 369/1 |
| 2006/0272863 A1* | 12/2006 | Donahue | 180/2.2 |
| 2007/0284159 A1* | 12/2007 | Takami et al. | 180/65.1 |
| 2008/0011528 A1* | 1/2008 | Verbrugge et al. | 180/65.2 |
| 2008/0224663 A1* | 9/2008 | Mack | 320/132 |
| 2009/0103341 A1* | 4/2009 | Lee et al. | 363/124 |
| 2010/0006351 A1* | 1/2010 | Howard | 180/2.2 |
| 2010/0055546 A1* | 3/2010 | Elder et al. | 429/61 |
| 2010/0117594 A1* | 5/2010 | Bissontz | 320/104 |
| 2010/0155161 A1* | 6/2010 | Corradini | 180/65.22 |
| 2010/0181126 A1* | 7/2010 | Penrod | 180/65.285 |
| 2011/0011659 A1* | 1/2011 | Sailor et al. | 180/65.245 |
| 2011/0100735 A1* | 5/2011 | Flett | 180/65.22 |
| 2011/0298414 A1* | 12/2011 | Manor et al. | 320/103 |
| 2012/0049792 A1* | 3/2012 | Crombez | 320/109 |

FOREIGN PATENT DOCUMENTS

| | | |
|---|---|---|
| WO | 2006/065364 A2 | 6/2006 |
| WO | 2006/065364 A3 | 6/2006 |

* cited by examiner

SCALABLE, HYBRID ENERGY STORAGE FOR PLUG-IN VEHICLES

TECHNICAL FIELD

The technical field of this disclosure concerns both hybrid electric vehicles of the type in which the propulsion system comprises a combustion engine associated with an electric motor/generator that at times operates as a traction motor for propelling the vehicle and at times as a generator for maintaining state-of-charge (SOC) of a battery bank, and electric vehicles whose propulsion systems lack an associated combustion engine. The disclosure of this patent application relates particularly to scalable, hybrid energy storage systems for such vehicles.

BACKGROUND OF THE DISCLOSURE

The ability of a hybrid electric vehicle's energy storage system to accept large quantities of energy within short periods of time for storage and to quickly deliver stored energy in large quantities can improve the performance and fuel economy of such vehicles. Present day energy storage systems comprise special energy storage devices, such as batteries having sophisticated chemistry and/or devices sometimes referred to as "supercapacitors". These devices can be generically described and constructed as high-voltage energy storage devices in contrast to the low-voltage battery or batteries present in the vehicle's low-voltage electrical system.

When the nature of vehicle operation involves frequent accelerations and decelerations, the energy storage system is subject to frequent cycling. The efficiency of energy recovery during vehicle braking depends on how much of the vehicle's kinetic energy can be accepted and stored by the energy storage system as the vehicle is decelerating. The ability of the energy storage system to contribute to vehicle propulsion torque depends on how much and how fast energy can be delivered from the energy storage system to the vehicle's drive train.

Sophisticated high-voltage batteries, using Lithium or Nickel Metal Hydride chemistries for example, are often used in hybrid electric vehicles instead of lead-acid storage batteries even though they are typically more expensive because they accept higher charge rates, enabling more efficient energy recovery and faster charging, and they have higher charge and discharge cycle endurance.

When an energy storage system also has a "plug-in" capability that enables it to be charged from an off-board electrical power grid providing AC power in an electric utility power format, such as 115-120-volt, 60-hertz, AC electricity from an electric utility company, an even more sophisticated and/or larger energy storage system may be used.

Certain vehicles may have a "plug-in" capability and rely extensively on energy obtained from an off-board power grid. The energy storage system of such a plug-in hybrid electric vehicle (PHEV) or a plug-in electric vehicle may be plugged into the electric utility grid during nighttime, when there is typically an excess of AC electricity available on the grid and the price per kilowatt-hour is typically at its lowest.

The energy storage capacity and the specific type and number of components of the energy storage system for any particular PHEV, or electric vehicle, may be chosen on the basis of how the vehicle is expected to be driven before the energy storage system is again re-charged.

SUMMARY OF THE DISCLOSURE

The energy storage system that is the subject of this disclosure is a "blended" one (i.e. a hybrid one) that uses a relatively larger number of relatively less expensive low-voltage lead-acid storage batteries as a low-voltage battery pack and a relatively smaller number of more sophisticated high-voltage batteries and/or supercapacitors as a high-voltage energy storage pack. The high-voltage energy storage pack is used to enable vehicle acceleration and capture deceleration energy while the lead-acid storage batteries are cycled less frequently.

A DC-to-DC converter powered by the low-voltage battery pack maintains SOC (state of charge) of the high-voltage energy pack. The low-voltage battery pack may be considered as providing "bulk" energy storage. The bulk energy storage capacity can be tailored to how a particular vehicle is expected to be used when in service by selecting a particular number of low-voltage batteries for the low-voltage battery bank and an appropriate number of AC-to-DC converters for connection to an AC power grid and DC-to-DC converters for maintaining SOC of the high-voltage energy storage pack.

A customer can select how many and what type of low-voltage batteries (deep cycle marine, AGM, traditional lead-acid, etc.) are appropriate for the particular vehicle being purchased and how it is expected to be used. A number of low-voltage batteries, an AC-to-DC converter, and a DC-to-DC converter can be arranged in a module that can be mounted on the vehicle in a suitable location. A representative embodiment would group six to eight, and possibly more, lead-acid batteries with a single DC-to-DC converter and a single AC-to-DC converter in a module. The manner in which some vehicles will be used may call for them to be equipped with multiple modules.

By using a relatively larger number of relatively lower cost, low-voltage storage batteries and a relatively smaller number of relatively higher cost high-voltage energy storage devices, the cost of the energy storage system is minimized. By using low-voltage packs, the total amount and type of cells incorporated in the low-voltage energy storage pack can be adapted for the particular vehicle. It is believed that this ability to scale the energy storage system to a particular drive cycle would be welcomed by customers.

Lower-voltage batteries are inherently easier to service. If one module in a multiple-module vehicle becomes weak or completely inoperative, the remaining ones remain operative. Individual battery cells can be tested and replaced instead of disposing of an entire pack. The cost to repair or replace individual battery cells will be less than that for replacing entire battery packs.

The combination of low-voltage energy storage batteries with DC-to-DC converter electronics and high-voltage energy storage can provide extended life for the low-voltage storage batteries. A typical vehicle will undergo hundreds of thousands of start-and-stop cycles within its lifetime. Typical energy storage batteries, such as deep-cycle lead-acid batteries, are capable of only about two thousand charge-discharge cycles. By combining deep-cycle batteries with DC-to-DC converter electronics and high-voltage energy storage, the number of charge and discharge cycles of the low-voltage batteries can be reduced from hundreds of cycles per day to as little as only one charge-discharge cycle per day. The reduction in cycles would equate to over five years of useful life for the low-voltage battery.

The DC-to-DC converter functionality allows an associated controller to estimate SOC and remaining battery life. The controller can disable certain modules to balance the state-of-charge and wear of the battery population. It can also enable diagnostics of individual modules.

One general aspect of the disclosure relates to a hybrid electric vehicle comprising: a combustion engine for propelling the vehicle via one or more driven wheels coupled to the engine through a drive train; a high-voltage energy storage bank; an electric motor/generator associated with the drive train for recovering kinetic energy from the vehicle to re-charge the high-voltage energy storage bank when operating as a generator, and when operating as a motor, for drawing electric current from the high-voltage energy storage bank to propel the vehicle through the drive train either by itself, or by adding additional torque to that being produced by the combustion engine; a low-voltage battery bank; a DC-to-DC converter for re-charging the high-voltage energy storage bank from the low-voltage battery bank; and an AC-to-DC converter for re-charging the low-voltage battery bank from a source of AC electricity.

Another general aspect of the disclosure relates to an electric vehicle comprising: an electric motor/generator that when operating as a motor powered by a high-voltage energy storage bank, propels the vehicle through a drive train coupled to one or more driven wheels and when operating as a generator, recovers kinetic energy from the vehicle to re-charge the high-voltage energy storage bank; a low-voltage battery bank; a DC-to-DC converter for re-charging the high-voltage energy storage bank from the low-voltage battery bank, and an AC-to-DC converter for re-charging the low-voltage battery bank from a source of AC electricity.

Another aspect relates to an energy storage module for a hybrid electric vehicle or an electric vehicle comprising a tray on which are disposed multiple low-voltage storage batteries connected in parallel circuit relationship to form a low-voltage battery bank, a DC-to-DC converter having an input connected to the low-voltage battery bank and providing a higher voltage output for use by a high-voltage energy storage bank, and an AC-to-DC converter connected to the low-voltage battery bank for re-charging the low-voltage battery bank from a source of AC electricity.

Still another aspect relates to a method of storing energy in and delivering energy from an energy storage system in a hybrid electric vehicle that has a combustion engine for propelling the vehicle via one or more driven wheels coupled to the engine through a drive train, a high-voltage energy storage bank, an electric motor/generator associated with the drive train for recovering kinetic energy from the vehicle to re-charge the high-voltage energy storage bank when operating as a generator, and when operating as a motor, for drawing electric current from the high-voltage energy storage bank to propel the vehicle through the drive train either by itself, or by adding additional torque to that being produced by the combustion engine, and a low-voltage battery bank.

The method comprises using a DC-to-DC converter in the vehicle to re-charge the high-voltage energy storage bank from the low-voltage battery bank; and using an AC-to-DC converter in the vehicle to re-charge the low-voltage battery bank from a source of AC electricity that is external to the vehicle.

Still another method aspect relates to using a DC-to-DC converter in an electric vehicle to re-charge a high-voltage energy storage bank from a low-voltage battery bank, and using an AC-to-DC converter in the vehicle to re-charge the low-voltage battery bank from a source of AC electricity that is external to the vehicle.

The foregoing summary, accompanied by further detail of the disclosure, will be presented in the Detailed Description below with reference to the following drawings that are part of this disclosure.

DETAILED DESCRIPTION

Figure 1:
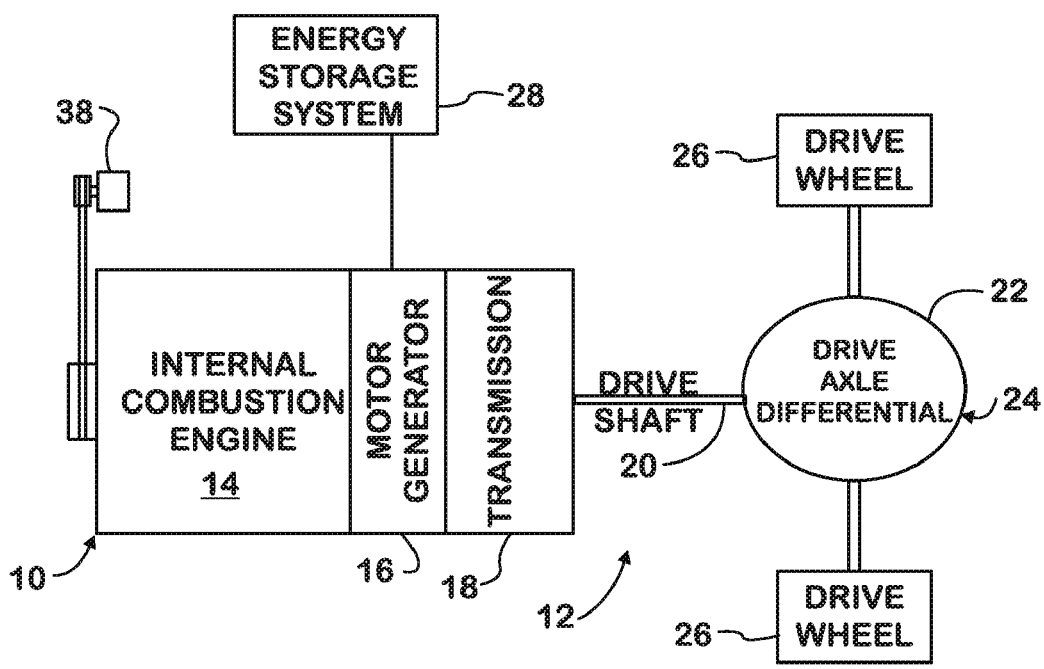
FIG. 1 is a schematic diagram of a representative propulsion system of a hybrid electric vehicle.

FIG. 1 shows a portion of an exemplary propulsion system 10 of a hybrid electric vehicle 12 as background for ensuing explanation of the other Figures. Not all mechanical detail of propulsion system 10 is shown.

Vehicle 12 is shown, by way of example, as a rear wheel drive type vehicle, in which propulsion system 10 is configured such that an output shaft of an internal combustion engine 14 and a rotor of a rotary AC electrical machine (i.e. a motor/generator) 16 are suitably coupled to an input shaft of a transmission 18 such that either or both engine 14 and motor/generator 16 can propel vehicle 12 via a drive train in which an output of transmission 18 is coupled via a driveshaft 20 to a differential 22 of a rear axle 24 having wheels 26 attached to outer ends of respective shafts, and such that when kinetic energy of the vehicle is to be recovered, the drive train can operate motor/generator 16 as a generator to re-charge an energy storage system 28 (FIG. 2) that stores the recovered energy for later use in operating motor/generator 16 as a motor.

Figure 2:
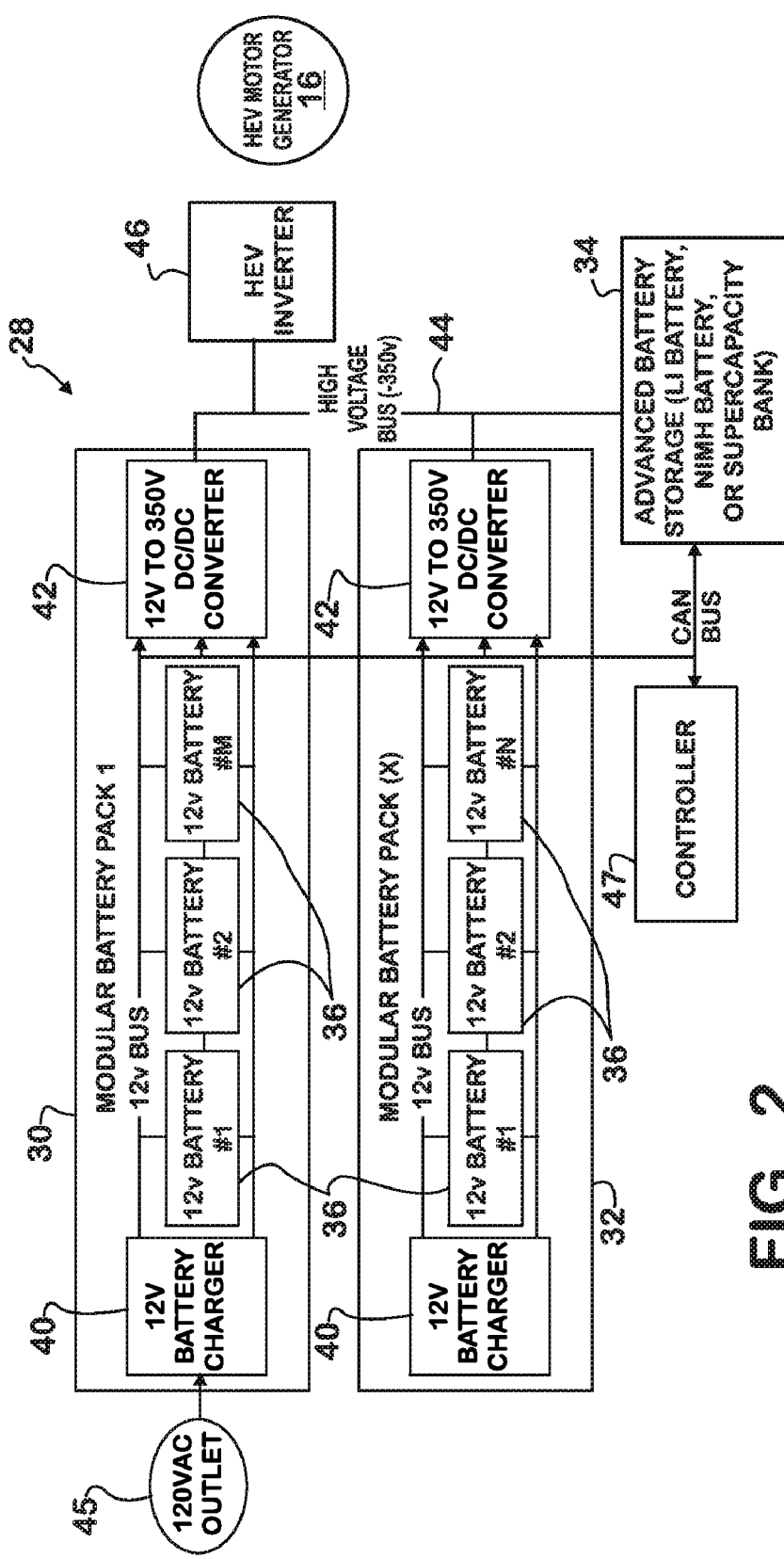
FIG. 2 is a schematic electrical diagram of the energy storage system of the vehicle.

FIG. 2 shows three modules 30, 32, 34, two of which, 30 and 32, contain low-voltage bulk energy storage batteries 36 (an example of which would be conventional low-voltage lead-acid storage batteries), and the third of which 34 contains one or more high-voltage energy storage devices such as Lithium batteries, Nickel Metal Hydride batteries, and/or "supercapacitors". Batteries 36 can be part of the vehicle's low-voltage electrical system (negative ground, 12 VDC, for example) that supplies the general needs of the vehicle and that can be charged by an engine-driven alternator 38 (FIG. 1). Alternately, batteries 36 can be arranged for exclusive use with the devices in module 34. A bulk energy storage battery is a battery cell that is designed for bulk energy storage. SAE (Society of Automotive Engineers) Group 31, for example, gives specifications for such batteries.

In addition to batteries 36, each module 30, 32 contains an AC-to-DC converter (sometimes simply called a battery charger) 40 and a DC-to-DC converter 42. Each low-voltage battery bank is connected an as input to the respective DC-to-DC converter 42. The output of each DC-to-DC converter 42 is on a high-voltage bus 44. By way of example, the low-voltage batteries may be nominal 12 VDC batteries, and high-voltage energy storage module may be nominal 345 VDC.

Module 34 is also on bus 44, as is an inverter 46 that is connected to motor/generator 16. Inverter 46 has a bi-directional DC-to-AC capability for enabling motor/generator 16 to deliver charge to module 34 when recovering energy and for enabling module 34 to deliver current for operating to motor/generator 16 as a motor. DC-to-DC converters 42 however are uni-directional, meaning that each low-voltage battery bank can deliver charge to the device(s) in high-voltage energy storage module 34, but the latter cannot deliver charge to the former.

A controller 47 is associated with DC-to-DC converters 42 and module 34 to perform controlling and monitoring functions. For example, the controller can disable certain modules to balance the state of charge and wear of the battery population. It can also enable diagnostics of individual modules and estimate SOC and remaining battery life. Controller 47 functions to maximize energy storage in the high-voltage energy bank during vehicle decelerations, and to maximize use of energy stored in the high-voltage energy bank when the vehicle accelerates.

Vehicle 12 has a "plug-in" capability that allows AC-to-DC converters 40 to be connected to an off-board power grid providing AC electricity, such as might be available by plugging into an electrical outlet 45 in a garage.

Figure 3:
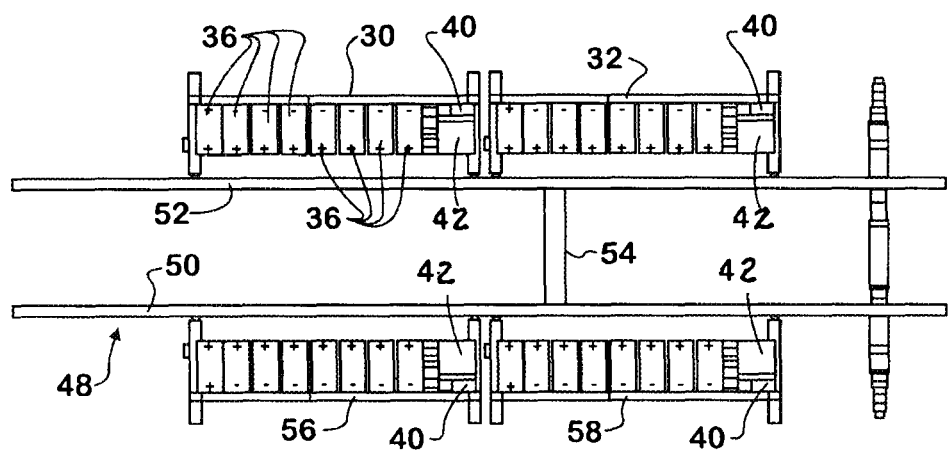
FIG. 3 shows an arrangement of the energy storage system in the vehicle.
Figure 4:
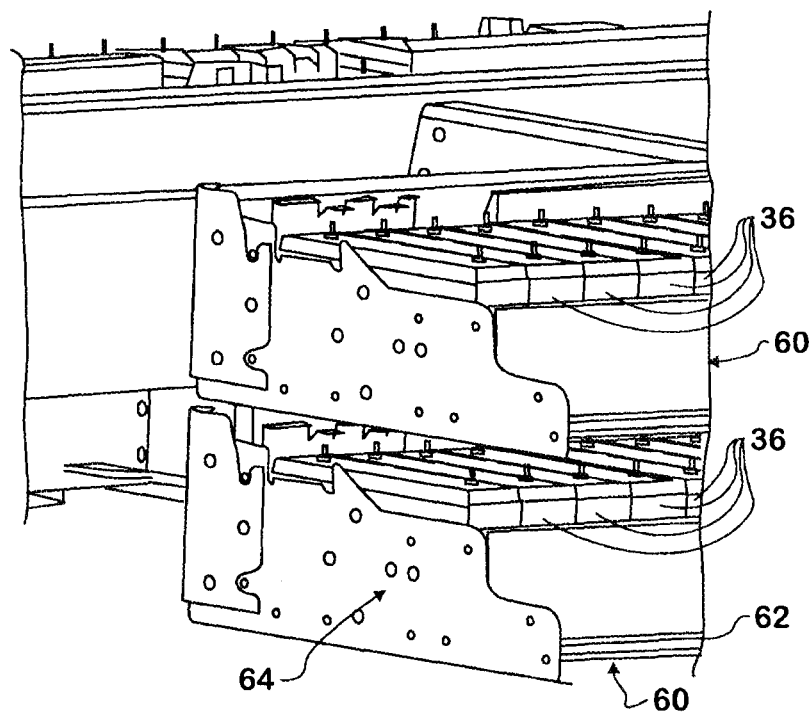
FIG. 4 is a fragmentary perspective view of a portion of the arrangement shown in FIG. 3 on a larger scale.

FIGS. 3 and 4 show a chassis frame 48 of vehicle 12 comprising side rails 50, 52 joined by cross members, such as a cross member 54. Modules 30 and 32 mount on side rail 52 separately from module 34, which is not shown in FIG. 3. Two additional modules 56 and 58 mount on side rail 50 also separately from module 34. The modules shown in FIG. 3 have eight batteries 36 each.

In each module, the lead-acid storage batteries 36 that form the respective low-voltage battery bank are arranged side-by-side and electrically connected in parallel circuit relationship with each other. A DC-to-DC converter 42 and an AC-to-DC converter 40 are disposed at the same lengthwise end. The length of each module runs parallel with the respective side rail on which it is mounted. The modules are disposed on the outboard side of each side rail enabling its components to be conveniently accessed.

FIG. 4 shows that each module comprises a tray 60 on which the batteries 36 and the converters 40, 42 are supported. The tray has a floor 62 and a sidewall structure 64 for holding the components in place. The components may be secured in place and/or covered as deemed appropriate.

With the omission of internal combustion engine 10, FIG. 1 may also be considered representative of an electric vehicle. The foregoing description and FIGS. 2, 3, and 4 would also apply to such an electric vehicle.

The disclosed hybrid electric vehicle and electric vehicle therefore have been shown to comprise a low-voltage battery bank, a DC-to-DC converter, and an AC-to-DC converter arranged in a module that is mounted on the vehicle separately from the high-voltage energy storage bank, with the DC-to-DC converter, and the AC-to-DC converter are arranged in the module with the AC-to-DC converter and the DC-to-DC converter at the same lengthwise end of the module. In each vehicle the low-voltage battery bank comprises multiple low-voltage storage battery cells which are electrically connected in parallel circuit relationship with each other. The module is mounted on a member of a chassis frame of the vehicle with its length parallel with that of the chassis frame member. The AC-to-DC converter comprises a circuit for converting utility-format AC power to an appropriate DC voltage for re-charging the low-voltage battery bank.

The energy storage module for an electric vehicle or hybrid electric vehicle has been shown to comprise a tray on which are disposed multiple low-voltage storage batteries connected in parallel circuit relationship to form a low-voltage battery bank, a DC-to-DC converter having an input connected to the low-voltage battery bank and providing a higher voltage output for use by a high-voltage energy storage bank; and an AC-to-DC converter connected to the low-voltage battery bank for re-charging the low-voltage battery bank from a source of AC electricity. The low-voltage battery bank, the DC-to-DC converter, and the AC-to-DC converter are arranged in the module with the AC-to-DC converter and the DC-to-DC converter within the same tray. The low-voltage storage batteries comprises lead-acid storage batteries connected in parallel. The AC-to-DC converter comprises a circuit for converting utility-format AC power to an appropriate DC voltage for re-charging the low-voltage battery bank.

What is claimed is:

1. A hybrid electric vehicle comprising:
    a combustion engine for propelling the hybrid electric vehicle via at least one driven wheel coupled to the combustion engine through a drive train;
    a high-voltage energy storage bank comprising at least one electric charge storage device selected from the group consisting of lithium batteries, nickel metal hydride batteries, and/or supercapacitors;
    an electric motor/generator associated with the drive train for recovering kinetic energy from the hybrid electric vehicle to re-charge the at least one electric charge storage device selected from the group consisting of lithium batteries, nickel metal hydride batteries, and/or supercapacitors of the high-voltage energy storage bank when operating as a generator, and when operating as a motor, for drawing electric current from the at least one electric charge storage device selected from the group consisting of lithium batteries, nickel metal hydride batteries, and/or supercapacitors of the high-voltage energy storage bank to propel the hybrid electric vehicle through the drive train by adding additional torque to torque being produced by the combustion engine;
    a low-voltage battery bank comprising multiple low-voltage lead-acid storage batteries which are electrically connected in parallel circuit relationship with each other;
    a uni-directional DC-to-DC converter for re-charging the at least one electric charge storage device selected from the group consisting of lithium batteries, nickel metal hydride batteries, and/or supercapacitors of the high-voltage energy storage bank from the multiple low-voltage lead-acid storage batteries of the low-voltage battery bank; and
    an AC-to-DC converter for re-charging the multiple low-voltage lead-acid storage batteries of the low-voltage battery bank from a source of AC electricity, the AC-to-DC converter comprising a circuit for converting utility-format AC electricity to an appropriate DC voltage for re-charging the multiple low-voltage lead-acid storage batteries of the low-voltage battery bank.

2. The hybrid electric vehicle as set forth in claim 1 in which the low-voltage battery bank, the uni-directional DC-to-DC converter, and the AC-to-DC converter are arranged in a module that is mounted on the hybrid electric vehicle separately from the high-voltage energy storage bank.

3. The hybrid electric vehicle as set forth in claim 2 in which the low-voltage battery bank, the uni-directional DC-to-DC converter, and the AC-to-DC converter are arranged in the module with both the AC-to-DC converter and the DC-to-DC converter disposed at an end of the module beyond the low-voltage battery bank.

4. The hybrid electric vehicle as set forth in claim 3 in which the module is mounted on a member of a chassis frame of the hybrid electric vehicle with a length of the module parallel with a length of the member of the chassis frame.

5. An energy storage module for at least one of an electric vehicle and hybrid electric vehicle, the energy storage module comprising:
    a tray which has a length and on which are disposed side-by-side along the length of the tray multiple low-voltage lead-acid storage batteries connected in parallel circuit relationship with each other to form a low-voltage battery bank;

a uni-directional DC-to-DC converter having an input connected to the low-voltage battery bank and providing a voltage output for use by a high-voltage energy storage bank;

an AC-to-DC converter connected to the low-voltage battery bank and comprising a circuit for converting utility-format AC electricity to an appropriate DC voltage for re-charging the low-voltage battery bank from a source of AC electricity; and in which the low-voltage battery bank, the uni-directional DC-to-DC converter, and the AC-to-DC converter are both disposed on the tray with both the AC-to-DC converter and the DC-to-DC converter disposed at an end of the tray beyond the low-voltage battery bank.

6. A method of storing energy in and delivering energy from an energy storage system in a hybrid electric vehicle that has a combustion engine for propelling the hybrid electric vehicle via at least one driven wheel coupled to the combustion engine through a drive train; a high-voltage energy storage bank comprising at least one electric charge storage device selected from the group consisting of lithium batteries, nickel metal hydride batteries, and/or supercapacitors; an electric motor/generator associated with the drive train for recovering kinetic energy from the hybrid electric vehicle to re-charge the at least one electric charge storage device selected from the group consisting of lithium batteries, nickel metal hydride batteries, and/or supercapacitors of the high-voltage energy storage bank when operating as a generator, and when operating as a motor, for drawing electric current from the at least one electric charge storage device selected from the group consisting of lithium batteries, nickel metal hydride batteries, and/or supercapacitors of the high-voltage energy storage bank to propel the hybrid electric vehicle through the drive train by adding additional torque to torque being produced by the combustion engine, and a low-voltage battery bank comprising multiple low-voltage lead-acid storage batteries which are electrically connected in parallel circuit relationship with each other, the method comprising the steps of:

using a uni-directional DC-to-DC converter in the hybrid electric vehicle to re-charge the at least one electric charge storage device selected from the group consisting of lithium batteries, nickel metal hydride batteries, and/or supercapacitors of the high-voltage energy storage bank from the multiple low-voltage lead-acid storage batteries of the low-voltage battery bank and to prevent the at least one electric charge storage device selected from the group consisting of lithium batteries, nickel metal hydride batteries, and/or supercapacitors of the high-voltage energy storage bank from charging the multiple low-voltage lead-acid storage batteries of the low-voltage battery bank; and using an AC-to-DC converter in the hybrid electric vehicle to re-charge the multiple low-voltage lead-acid storage batteries of the low-voltage battery bank from a source of utility format AC electricity that is external to the hybrid electric vehicle.

7. A method of storing energy in and delivering energy from an energy storage system in an electric vehicle that comprises an electric motor/generator for propelling the electric vehicle via at least one driven wheel through a drive train when the motor/generator is operating as a motor and for re-charging at least one electric charge storage device selected from the group consisting of lithium batteries, nickel metal hydride batteries, and/or supercapacitors of a high-voltage energy storage bank of the energy storage system when operating as a generator recovering kinetic energy from the electric vehicle, the method comprising the steps of:

using a uni-directional DC-to-DC converter in the electric vehicle to re-charge the at least one electric charge storage device selected from the group consisting of lithium batteries, nickel metal hydride batteries, and/or supercapacitors of the high-voltage energy storage bank from multiple low-voltage lead-acid storage batteries which are electrically connected in parallel circuit relationship with each other to form a low-voltage battery bank in the electric vehicle and to prevent the at least one electric charge storage device selected from the group consisting of lithium batteries, nickel metal hydride batteries, and/or supercapacitors of the high-voltage energy storage bank from charging the multiple low-voltage lead-acid storage batteries of the low-voltage battery bank; and using an AC-to-DC converter in the electric vehicle to re-charge the multiple low-voltage lead-acid storage batteries of the low-voltage battery bank from a source of utility format AC electricity that is external to the electric vehicle.

8. An electric vehicle comprising an electric motor/generator for propelling the electric vehicle via at least one driven wheel coupled to the electric motor/generator through a drive train when operating as a motor and when operating as a generator, for recovering kinetic energy from the electric vehicle, a high-voltage energy storage bank comprising at least one electric charge storage device selected from the group consisting of lithium batteries, nickel metal hydride batteries, and/or supercapacitors that is re-charged by the motor/generator operating as a generator and that delivers electric current for operating the motor/generator as a motor to the propel the electric vehicle, a low-voltage battery bank comprising multiple low-voltage lead-acid storage batteries which are electrically connected in parallel circuit relationship with each other, a uni-directional DC-to-DC converter for re-charging the at least one electric charge storage device selected from the group consisting of lithium batteries, nickel metal hydride batteries, and/or supercapacitors of the high-voltage energy storage bank from the multiple low-voltage lead-acid storage batteries of the low-voltage battery bank, and an AC-to-DC converter for re-charging the multiple low-voltage lead-acid storage batteries of the low-voltage battery bank from a source of utility format AC electricity.

9. The electric vehicle as set forth in claim 8 in which the low-voltage battery bank, the uni-directional DC-to-DC converter, and the AC-to-DC converter are arranged in a module that is mounted on the electric vehicle separately from the high-voltage energy storage bank.

10. The electric vehicle as set forth in claim 9 in which the low-voltage battery bank, the uni-directional DC-to-DC converter, and the AC-to-DC converter are arranged in the module with both the AC-to-DC converter and the DC-to-DC converter disposed on a common tray and at an end of the common tray beyond the low-voltage battery bank.

11. The electric vehicle as set forth in claim 10 in which the module is mounted on a member of a chassis frame of the electric vehicle with a length of the common tray parallel with a length of the member of the chassis frame, and in which both the AC-to-DC converter and the DC-to-DC converter are disposed at a lengthwise end of the common tray.

* * * * *